United States Patent
Marupaduga

(10) Patent No.: US 11,432,359 B1
(45) Date of Patent: Aug. 30, 2022

(54) USE OF ACCESS-BLOCK HISTORY AS BASIS TO DYNAMICALLY CONTROL MAXIMUM NUMBER OF CONNECTION-REQUEST TRANSMISSIONS PER ACCESS ATTEMPT

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 60 days.

(21) Appl. No.: 16/949,273

(22) Filed: Oct. 22, 2020

(51) Int. Cl.
*H04W 16/18* (2009.01)
*H04W 76/18* (2018.01)
*H04W 74/08* (2009.01)
*H04W 72/12* (2009.01)
*H04L 1/18* (2006.01)

(52) U.S. Cl.
CPC .......... *H04W 76/18* (2018.02); *H04L 1/1819* (2013.01); *H04W 72/1263* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2013/0201960 A1* | 8/2013 | Kim | H04W 8/06 370/336 |
| 2014/0315536 A1* | 10/2014 | Chow | H04W 4/50 455/419 |
| 2015/0078286 A1* | 3/2015 | Kim | H04W 74/0833 370/329 |
| 2015/0173105 A1* | 6/2015 | Bergstrom | H04W 72/042 370/329 |
| 2018/0176961 A1* | 6/2018 | Babaei | H04W 74/0833 |
| 2018/0279229 A1* | 9/2018 | Dinan | H04W 52/281 |
| 2020/0107377 A1* | 4/2020 | Lee | H04L 1/1812 |
| 2020/0196172 A1* | 6/2020 | Abouelmaati | H04B 17/0085 |
| 2021/0084048 A1* | 3/2021 | Kannan | G06N 20/00 |

* cited by examiner

*Primary Examiner* — Brandon M Renner

(57) ABSTRACT

A method and system for dynamically controlling connection-request transmission in a cell provided by an access node, the access node supporting access attempts by user equipment devices (UEs), each access attempt including the UE engaging in random access signaling with the access node and the UE then engaging in up to a maximum allowed number of connection-request transmissions to the access node in an effort to ensure successful receipt by the access node of a connection request from the UE, where an access block occurs if the access node does not successfully receive connection-request transmission from the UE through the maximum allowed number connection-request transmissions. An example method includes (i) determining an extent to which the cell has experienced such access blocks and (ii) using the determined extent as a basis to dynamically set a maximum allowed number of connection-request transmissions per access attempt in the cell.

18 Claims, 4 Drawing Sheets

---

DETERMINE AN EXTENT TO WHICH A CELL HAS EXPERIENCED ACCESS BLOCKS DUE TO CONNECTION-REQUEST COMMUNICATION FAILURE — 32

USE THE DETERMINED EXTENT AS A BASIS TO DYNAMICALLY SET A MAXIMUM ALLOWED NUMBER OF CONNECTION-REQUEST TRANSMISSIONS PER ACCESS ATTEMPT IN THE CELL — 34

USE OF ACCESS-BLOCK HISTORY AS BASIS TO DYNAMICALLY CONTROL MAXIMUM NUMBER OF CONNECTION-REQUEST TRANSMISSIONS PER ACCESS ATTEMPT

BACKGROUND

A typical wireless communication system includes a number of access nodes that are configured to provide wireless coverage areas, referred to as cells, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the system could engage in air interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each cell could operate on a radio-frequency (RF) carrier, which could be frequency division duplex (FDD), defining separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities. Further, each cell could have a physical cell identity (PCI) or the like that identifies the cell on the carrier, to help distinguish the cell from others cells that operate on the same carrier.

On the downlink and uplink, the air interface of each cell could be configured in a specific manner to define physical resources for carrying data (e.g., user-plane data and control-plane signaling) wirelessly between the access node and UEs.

Without limitation, for instance, the air interface of each cell could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals, reference signals, system information, and other control signaling such as PRB-scheduling directives and acknowledgement messaging from the access node to UEs. And on the uplink, certain resource elements could be reserved to carry random-access signals and other control signaling such as PRB-scheduling requests, acknowledgement messaging, and channel-quality reports from UEs to the access node.

Overview

In example operation, when a UE enters into coverage of such a network, the UE could initially scan for coverage and detect threshold strong coverage of a cell provided by an access node. And the UE could then engage in an access process in an effort to connect with the access node in the selected cell, i.e., the UE could engage in an access attempt.

In a typical access attempt, the UE could first engage in random-access signaling with the access node to get the access node's attention and establish uplink transmission timing, and the UE could then engaging in Radio Resource Control (RRC) signaling with the access node to establish an air-interface connection (e.g., RRC connection) through which the access node will then serve the UE in the cell.

In particular, the UE could first transmit to the access node a random-access preamble (referred to as "Msg1"), and the access node could responsively transmit to the UE a random-access response (referred to as "Msg2") providing the UE with an initial uplink PRB grant that specifies allocated PUSCH resources in which the UE could then transmit an RRC Connection Request. The UE could then transmit to the access node, in the allocated PUSCH resources, an RRC Connection Request (referred to as "Msg3"), and the access node could responsively transmit to the UE an RRC Connection Setup message (referred to as "Msg4"). In turn, the UE could then responsively transmit to the access node an RRC Connection Setup Complete message, denoting completion of the RRC connection setup and thus completion of setup of an RRC connection for the UE.

Further, when the UE transmits to the access node the RRC Connection Request message (Msg3), before the access node then proceeds with sending to the UE an RRC Connection Setup message (Msg4), the access node and UE could engage in a hybrid automatic repeat request (HARQ) process to help ensure that the access node has successfully received the UE's RRC Connection Request message.

In a representative HARQ process, for instance, the access node could apply a cyclic redundancy check (CRC) to determine whether the access node successfully received the UE's RRC Connection Request message. And if so, the access node could then transmit to the UE a positive acknowledgement message (ACK) and then proceed with transmission to the UE of an RRC Connection Setup message. Whereas, if not, the access node could then instead transmit to the UE a negative acknowledgement message (NACK), in response to which the UE may then retransmit its RRC Connection Request to the access node, possibly with added error-correction data to help increase the likelihood of successful receipt.

In some implementations, a given cell could be pre-configured to allow up to just a limited maximum number of such RRC-Connection-Request transmissions per access attempt, with the maximum number possibly being on the order of 3 to 5. For instance, the access node that provides the cell could be pre-provisioned with this setting. And the access node could broadcast an indication of the setting, so that UEs seeking to connect with the access node in the cell could determine and comply with the setting. By way of example, the access node could broadcast in the cell a system information message that specifies this maximum number of RRC-Connection-Request transmissions per access attempt as a "maxHARQ-Msg3Tx" value.

When a UE engages in the access attempt in such a cell, if the UE engages in the maximum allowed number of RRC-Connection-Request transmissions without receiving an associated ACK from the access node, the UE and access node may both deem the UE's access attempt to have failed, defining an "access block". When that happens, the UE may then responsively abandon the access attempt and start over, again scanning for coverage (possibly for a next strongest cell) and attempting the access process again.

Unfortunately, however, such access blocks are undesirable, as they could create delay that could adversely impact user experience (if applicable) or cause other problems.

The present disclosure provides a mechanism that may help address this issue. The disclosure stems from a realization that certain cells may be more prone to experience such access blocks than other cells and/or may tend to experience the access blocks more at certain times of day than at other times of day, among other possibilities. For instance, if or when extenders or other devices create, contribute to, or amplify uplink noise in an access node's cell, it may be more difficult for the access node to receive RRC Connection Requests from UEs, and the likelihood of access blocks may increase.

One way to help address a scenario where an access node tends to experience a relatively high extent of access blocks is to dynamically increase the cell's maximum allowed number of RRC-Connection-Request transmissions per access attempt. Allowing a greater number of RRC-Connection-Request transmissions per access attempt in such a cell may help to increase the likelihood of ultimately successful RRC-Connection-Request transmission in the cell and may therefore help to decrease the access-block rate in the cell.

Accordingly, the present disclosure provides for (i) tracking a rate or other extent to which a cell experiences access blocks due to RRC-Connection-Request transmission failure and (ii) using that tracked extent of access blocks as a basis to dynamically set the cell's maximum allowed number of RRC-Connection-Request transmissions per access attempt.

In an example implementation, for instance, a computing system could apply mapping data that correlates various access-block rates with respective maxHARQ-Msg3Tx values, with lower access-block rates being correlated with lower maxHARQ-Msg3Tx values, and higher access-block rates being correlated with higher maxHARQ-Msg3Tx values. If or when a cell tends to experience a relatively high access-block rate, the computing system could accordingly set the cell's maxHARQ-Msg3Tx to a higher value. And if or when a cell tends to experience a relatively low access-block rate, the computing system could accordingly set the cell's maxHARQ-Msg3 Tx to a lower value.

Alternatively or additionally, a cell could be set with a default maxHARQ-Msg3 Tx value, and the computing system could determine that the cell's access-block rate is at least predefined threshold high and, in response, could increase the cell's maxHARQ-Msg3Tx value from the default value to a higher value, so as to allow a greater number of RRC-Connection-Request transmissions per access attempt in the cell.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system supporting 4G LTE and/or 5G NR. But it should be understood that the disclosed principles could extend to apply in other scenarios as well, such as with other RATs, and with other network configurations, among other possibilities. More generally, it should be understood that other changes from the specific arrangements and processes described are possible. For instance, various described entities, connections, operations, and other elements could be added, omitted, distributed, re-located, re-ordered, combined, or changed in other ways. In addition, various operations described as being performed by one or more entities could be implemented in various ways, such as by a processing unit executing instructions stored in non-transitory data storage, along with associated circuitry or other hardware, among other possibilities.

Figure 1:
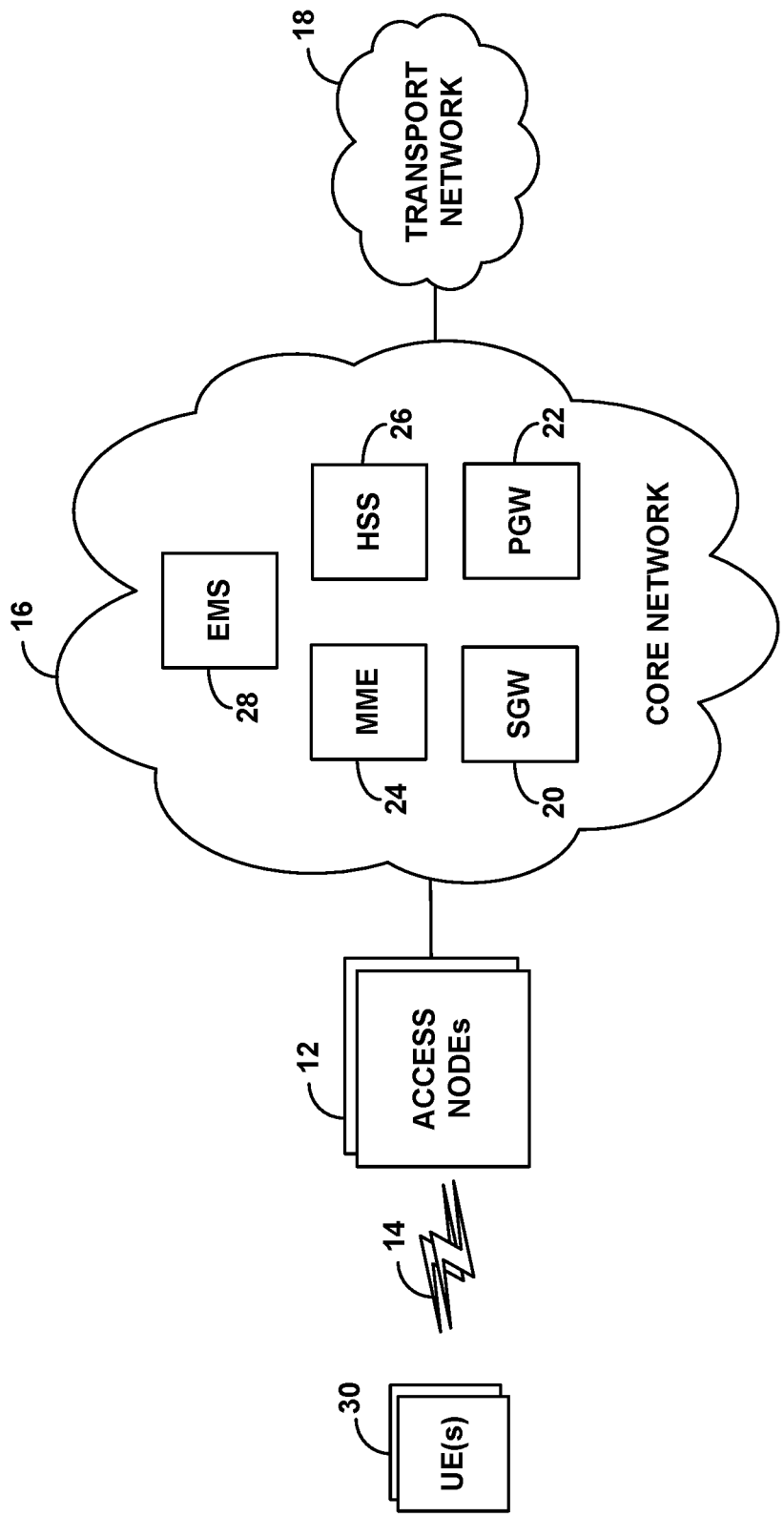
FIG. 1 is a simplified block diagram of an example network arrangement in which features of the present disclosure can be implemented.

FIG. 1 is a simplified block diagram of an example network arrangement including various example access nodes 12, each providing at least one respective cell 14, and each being interfaced with at least one core network 16 that provides connectivity with a transport network 18 such as the Internet.

Each of the illustrated access nodes 12 could take various forms. For instance, the access nodes could be 4G LTE access nodes (e.g., evolved Node-Bs (eNBs)) or 5G NR access nodes (e.g., next generation Node-Bs (gNBs)), among other possibilities. And the access nodes could be macro access nodes of the type configured to provide a wide range of coverage or could take other forms, such as small cell access nodes, relays, femtocell access nodes, or the like, possibly configured to provide a smaller range of coverage.

Each access node's cell 14 could defined on a respective carrier, which, as noted above, could be FDD or TDD and defined in a given frequency band, although multiple access nodes might operate on the same carrier as each other, providing respective different cells than each other. To provide coverage and service in such a cell, an access node could be equipped with a baseband unit, a radio head, and an antenna structure, among other components and logic.

The air interface on each of these carriers could be structured as described above by way of example, being divided over time into frames, subframes, and symbol time segments, and over frequency into subcarriers, thus defining an array of air-interface resource elements grouped and designated for particular use to carry data (including control-plane signaling and user-plane data) to or from served UEs. Although specifics could vary from RAT to RAT and/or based on other factors.

By way of example, on the downlink, certain resource elements per subframe could be generally reserved to define a physical downlink control channel (PDCCH) for carrying control signaling such as scheduling directives from the access node to served UEs, other resource elements per subframe could be generally reserved to define a physical HARQ channel (PHICH) for carrying acknowledgement signaling to served UEs, and other resource elements per subframe could be generally reserved to define a physical downlink shared channel (PDSCH) in which the resource elements could be grouped to define the PRBs noted above, allocable by the access node on an as needed basis to carry data communication from the access node to UEs.

Further, within these generally reserved groups of downlink resource elements, certain resource elements could be excluded and separately reserved for other use. For instance, certain resource elements could be reserved to carry synchronization signals that encode the cell's PCI and that UE's could detect as an indication of coverage and as a basis to establish frame timing. Further, other resource elements could be reserved to carry a cell-specific reference signal that UEs could evaluate in order to determine cell coverage strength, or synchronization signals could double as such a reference signal. Still further, certain resource elements could be reserved to carry system broadcast messages, such as a master information block (MIB) and various System Information Blocks (SIBs).

Likewise, on the uplink, certain resource elements per subframe could be reserved to define an uplink control channel (PUCCH) for carrying control signaling such as scheduling requests from UEs to the access node, and other resource elements per subframe could be generally reserved to define a physical uplink shared channel (PUSCH) in which the resource elements could be grouped to define the PRBs noted above, allocable by the access node on an as needed basis to carry data communications from UEs to the access node.

And within these generally reserved groups of uplink resource elements, certain resource elements could similarly be excluded from the PUCCH and PUSCH and reserved for other use. For instance, certain resource elements could be reserved to define physical random access channel (PRACH) instances in which UEs could transmit random-access signals such as RACH preambles to the access node. And other resource elements could be reserved to carry UE-specific uplink reference signals, such as sounding reference signals for instance, which the access node could use as basis to evaluate uplink channel quality for instance.

The core network(s) 16 with which these access nodes could be interfaced could also take various forms, likely a packet-switched network such as an Evolved Packet Core (EPC) (e.g., 4G core) or Next Generation Core (NGC) (e.g., 5G core), supporting virtual-packet tunnel interfaces between various nodes. As shown, for instance, an example core network 16 could be an EPC network, including a serving gateway (SGW) 20, a packet data network gateway (PGW) 22, a mobility management entity (MME) 24, a home subscriber server (HSS) 26, and an element management system (EMS) 28, although other arrangements are possible as well.

In an example arrangement, each access node could have an interface with the SGW 20, the SGW 20 could have an interface with the PGW 22, and the PGW 22 could provide connectivity with the transport network 18. In addition, each access node could have an interface with the MME 24, and the MME 24 could have an interface with the SGW 20, so that the MME 20, functioning as a core-network controller, could coordinate setup of bearers for UEs to enable the UEs to engage in wireless packet-data communication.

Still further, the HSS 26 could store or have access to UE profile records, which could specify service-subscription plans, UE configurations, and/or other such UE capability information. And the EMS 28 could be a centralized computing system that functions as a repository of operational data for the network and to control and manage operation of various network elements such as the access nodes 12.

FIG. 1 also illustrates a number of UEs 30 that may be within coverage of the various illustrated cells 14 from time to time. Each of these UEs could take any of the forms noted above among other possibilities.

In an example implementation, upon entering into coverage of this network, a representative UE could initially scan for and discover coverage of a strongest available cell. For instance, the UE could scan various carriers in search of broadcast synchronization signals that would indicate the presence of coverage, and upon thereby detecting the presence of one or more cells, could then evaluate reference-signal strength per cell and select the cell with the strongest reference-signal strength.

Upon discovering a strongest such cell, the UE could then engage in an access attempt as discussed above, in an effort to connect with the access node that provides the cell. For instance, the UE could first transmit to the access node in a PRACH instance of the cell a randomly-selected RACH preamble that functions as a random-access request (Msg1) but that does not actually identify the UE. And upon receipt of this RACH preamble, the access node could then transmit to the UE a random-access response message (Msg2) that provides the UE with an initial uplink-PRB grant. And the UE could then transmit to the access node in the initially allocated PRBs an RRC Connection Request (Msg3), in which the UE could provide the UE's actual identity among other information. Upon receipt of this RRC Connection Request, the access node could then assign to the UE a Cell Radio Network Temporary Identifier (C-RNTI) that will uniquely identify the UE's RRC connection and could establish in data storage a context record for the RRC connection, and the access node could transmit to the UE an RRC Connection Setup message (Msg4) providing the assigned C-RNTI. Further, the UE could then transmit to the access node an RRC Setup Complete message denoting completion of setup of an RRC connection for the UE.

As further noted above, the UE and access node could engage in a HARQ process to help ensure that the access node successfully receives the UE's RRC Connection Request message (Msg3).

In a representative HARQ process, for instance, the UE could provide with its RRC Connection Request message (e.g., in a message header) a CRC value that the UE computes based on the data of the message. And if the access node receives a transmission from the UE in the initially granted uplink PRBs, the access node could then correspondingly compute a CRC based on data of the received transmission and determine whether its computed CRC matches the CRC provided by the UE.

If the access node determines that the CRC matches, then the access node could conclude that the UE's RRC-Connection-Request transmission was successful and could responsively transmit to the UE an ACK and then proceed with processing of the RRC Connection Request and transmission to the UE of an RRC Connection Setup message. Whereas, if the access node does not receive the scheduled transmission from the UE or receives the transmission and determines that the CRC does not match, then the access node could conclude that the UE's RRC-Connection-Request transmission was not successful and could responsively transmit to the UE a NACK, in response to which the UE could engage in re-transmission of its RRC Connection Request message to the access node, possibly with added error-correction coding as noted above.

As indicated above, each such cell could have a configured maxHARQ-Msg3Tx setting that defines the maximum allowed number of RRC-Connection-Request transmissions per access attempt. And the access node could broadcast this maxHARQ-Msg3Tx setting for receipt and use by UEs that would seek to connect in the cell. For instance, the access node could include this maxHARQ-Msg3Tx setting in a SIB message, which a UE could read once the UE has discovered coverage of the cell and before the UE begins the access attempt. Further, example maxHARQ-Msg3Tx values could be up to 8 and, as noted above, may be on the order of 3 to 5, although other examples could be possible.

As noted above, if and when a UE has engaged in the maxHARQ-Msg3Tx number of RRC-Connection-Request message transmissions as part of an access attempt and, through those transmissions, the access node does not successfully receive the UE's RRC Connection Request, the UE and access node could deem the UE's access attempt to have failed—as an access block. Further, as noted above, the UE could then responsively start over again, possibly attempting access in a next strongest cell instead.

Per the present disclosure, a computing system could keep track of the rate of such access blocks experienced by a given cell (i.e., as to UE(s) attempting to acquire connectivity in the cell) and could use the tracked rate of the cell's access blocks as a basis to control the maxHARQ-Msg3Tx setting of the cell. The computing system that carries out this process could be provided at various locations, two examples of which are (i) at the access node that provides the cell and (ii) at the EMS 28.

In an example implementation, the computing system could keep a record of access blocks experienced by the cell. This could be a record of individual instances of the cell experiencing access block based on failed RRC-Connection-Request transmission. And/or this could be statistical data representing an extent of such instances. For instance, the record could indicate a most recent (current) access-block rate of the cell, perhaps as a rolling average quantity of such access blocks experienced by the cell per unit time over a recent sliding window of time. Further or alternatively, the record could indicate various representative access-block rates of the cell on a per time-of-day basis (e.g., any calendar basis), to support a prediction of what the cell's likely access-block rate is at a current time of day in view of what the cell's access-block is typically at that time of day. Other examples are possible as well.

If the computing system is at the access node that provides the cell, e.g., provided by a host processor of the access node, the computing system could identify and track instances of access blocks in the cell. Each such instance could be where the access node has ultimately failed to successfully receive a UE's RRC Connection Request in a given access attempt, notwithstanding the UE engaging in the cell's maxHARQ-Msg3Tx number of RRC-Connection-Request transmissions for the access attempt. The computing system at the access node could thus keep the record of such access blocks as noted above.

Whereas, if the computing system is at the EMS 28, the computing system could receive reports of such access blocks from the access node that provides the cell at issue. For example, each time the cell experiences such an access block, the access node could report that fact to the EMS 28, or the access node could periodically report to the EMS 28 rolled up records of such access blocks since a last report. Further, the EMS 28 could receive such information and keep records of access blocks per cell for each of various cells in the network, perhaps per PCI and/or other cell identifier.

In addition, the computing system could use this tracked access-block data for a cell as a basis to dynamically configure the cell's maxHARQ-Msg3Tx setting. For instance, the computing system could monitor the cell's access-block rate, as an actual most recently determined access-block rate or predicted by or for the computing system based on historical access-block data as noted above. And the computing system could map the cell's access-block rate to a particular maxHARQ-Msg3Tx value.

As noted above, for instance, the computing system could include or have access to mapping data that correlates various access-block rates (e.g., ranges of such rates) with associated maxHARQ-Msg3Tx values, such as with higher maxHARQ-Msg3Tx values for higher access-block rates and lower maxHARQ-Msg3Tx values for lower access-block rates. This mapping data could be established by engineering input and/or through automated means. The computing system could thus refer to this mapping data to determine, based on a cell's access-block rate, what the cell's maxHARQ-Msg3Tx setting should be. And the computing system could then accordingly configure the cell's maxHARQ-Msg3Tx setting (e.g., cause the cell's maxHARQ-Msg3Tx setting to be so configured).

Alternatively or additionally, as noted above, the cell's maxHARQ-Msg3Tx value could be set to a default value, and the computing system could use the cell's access-block rate as a basis to adjust the cell's maxHARQ-Msg3Tx value. For instance, the computing system could determine whether the cell's access-block rate is at least as high as a predefined threshold level, which could also be set by engineering input or in other ways. And in response to determining that the cell's access-block rate is at least as high as the predefined threshold level, the computing system could adjust the cell's maxHARQ-Msg3Tx value to a value higher than the default value.

If the computing system is at the cell's access node, the computing system could directly set the cell's maxHARQ-Msg3Tx value by recording it at the access node and reconfiguring the SIB2 message that the access node broadcasts so that the SIB2 message will specify the determined maxHARQ-Msg3Tx value, and UEs could receive and operate according to that setting. Alternatively, if the computing system is at the EMS 28, the computing system could set the cell's maxHARQ-Msg3Tx value by transmitting to the access node a signaling message to which the access node is configured to respond by so setting the maxHARQ-Msg3Tx value.

This process could then continue iteratively. If or when the cell's access-block rate changes sufficiently, the computing system could accordingly adjust the cell's max-HARQ-Msg3Tx value.

Figure 2:
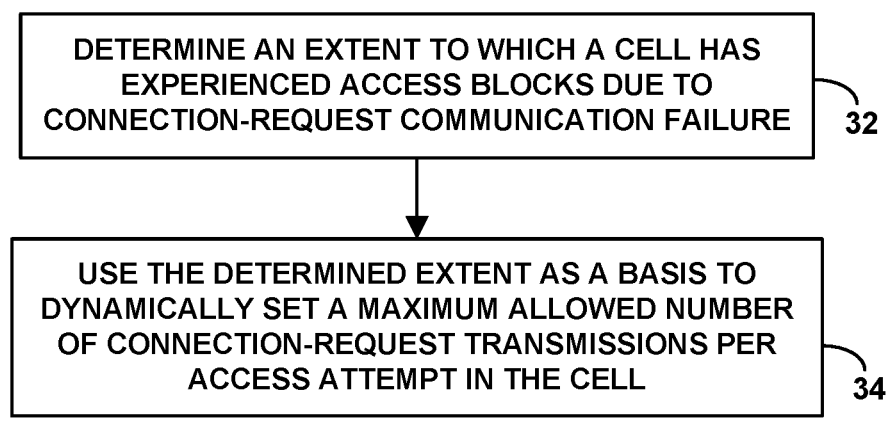
FIG. 2 is a flow chart depicting a method that could be carried out in accordance with the disclosure.

FIG. 2 is next a flow chart depicting a method that could be carried out in accordance with the present disclosure, to dynamically control connection-request transmission in a cell of a wireless communication system. As shown in FIG. 2, at block 32, the method includes determining an extent to which the cell has experienced access blocks due to connection-request communication failure. And at block 34, the method includes using the determined extent as a basis to dynamically set a maximum allowed number of connection-request transmissions per access attempt in the cell.

This method could be carried out with respect to connection requests such as RRC Connection Request messages. Though the method could also be carried out with respect to other such connection requests.

In line with the discussion above, the cell could be provided by an access node, and the access node could support access attempts by UEs, each access attempt by a UE respectively including (i) the UE engaging in random access signaling with the access node and (ii) the UE then engaging in up to the maximum allowed number of connection-request transmissions to the access node in an effort to ensure successful receipt by the access node of a connection request from the UE. Further, as noted above, an access block could be deemed to have occurred each time the access node does not successfully receive connection-request transmission from the UE through the maximum allowed number connection-request transmissions by the UE.

In addition, as discussed above, the act of the UE engaging in up to the maximum allowed number of connection-request transmissions to the access node could be a HARQ process. And the maximum allowed number of connection-request transmissions per access attempt in the cell could be defined by a maxHARQ-Msg3Tx value.

Further, as discussed above, the act of using the determined extent as a basis to dynamically set the maximum allowed number of connection-request transmissions per access attempt in the cell could involve (i) determining, by referring to mapping data that correlates various extents of access blocks respectively to associated maximum allowed numbers of connection-request transmissions per access attempt, a maximum allowed number of connection-request transmissions corresponding with the determined extent and (ii) based on the determining of the maximum allowed number, setting the maximum allowed number of connection-request transmissions per access attempt in the cell to be the determined maximum allowed number. And as noted above, the mapping data could define progressively higher maximum allowed numbers for progressively higher extents of access blocks.

Still further, the cell could be set with a default maximum allowed number of connection-request transmission per access attempt. And in that case, the act of using the determined extent as a basis to dynamically set the maximum allowed number of connection-request transmissions per access attempt in the cell could involve (i) determining that the determined extent is at least as high as a predefined threshold extent and (ii) responsive to at least the determining that the determined extent is at least as high as a predefined threshold extent, adjusting the maximum allowed number of connection-request transmissions per access attempt in the cell from the default maximum number to a modified maximum number that is higher than the default maximum number.

In addition, as noted above, the determined extent to which the cell has experienced the access blocks could be a rate of access blocks experienced in the cell. And determining the extent to which the cell has experienced the access blocks could involve (i) tracking occurrences of the access blocks in the cell over time and determining the extent as a most recent extent and/or (ii) tracking occurrences of the access blocks in the cell on a per time of day basis to facilitate a prediction of an extent of access blocks in the cell.

Yet further, as discussed above, the cell could be provided by an access node, and the method could be carried out by the access node. Or the cell could be provided by an access node, and the method could be carried out by a computing system external to the access node—in which case using the determined extent as a basis to dynamically set the maximum allowed number of connection-request transmissions per access attempt in the cell could involve (i) the computing system using the determined extent as a basis to determine the maximum allowed number and (ii) the computing system transmitting to the access node a control signal specifying the determined maximum allowed number, the control signal being interpretable by the access node to cause the access node to set the maximum allowed number.

And still further, as discussed above, the cell could be provided by an access node, and the act of setting the maximum allowed number of connection-request transmissions per access attempt in the cell could involve setting the maximum allowed number at the access node, where the access node broadcasts a control signal that specifies the set maximum allowed number.

Figure 3:
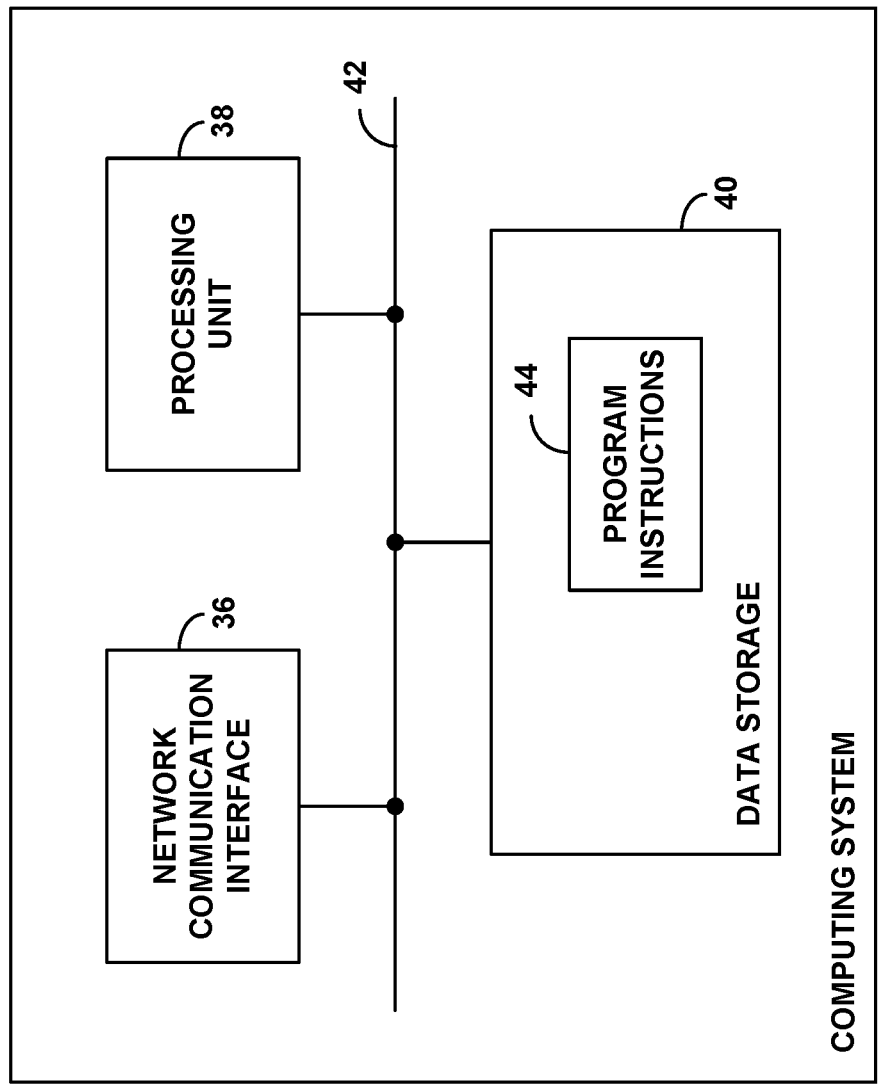
FIG. 3 is a simplified block diagram of an example computing system operable in accordance with the disclosure.

FIG. 3 is next a simplified block diagram of an example computing system that could be operable to control connection-request transmission in a cell of a wireless communication system. As noted above, the cell could be provided by an access node, and the computing system could be provided at the access node and/or at an entity external to the access node such as at an EMS, among other possibilities.

As shown in FIG. 3, the example computing system includes a network communication interface 36, a processing unit 38, and non-transitory data storage 40, all of which could be integrated together and/or interconnected by a system bus, network, or other connection mechanism 42.

The network communication interface 36 could comprise a physical network connector and associated communication logic (e.g., protocol stacks) to facilitate network communication with various other entities. The processing unit 38 could comprise one or more processors, such as one or more general purpose processors (e.g., microprocessors) and/or one or more special-purpose processors (e.g., application specific integrated circuits). And the non-transitory data storage 40 could comprise one or more volatile and/or non-volatile storage components (e.g., magnetic, optical, or flash storage, necessarily non-transitory).

As shown, the data storage 40 could then store program instructions 44, which could be executable by the processing unit 38 to cause the computing system to carry out various operations described herein, such as the operations depicted and described with respect to FIG. 2 for instance.

Various other features described herein can be implemented in this context as well, and vice versa.

Figure 4:
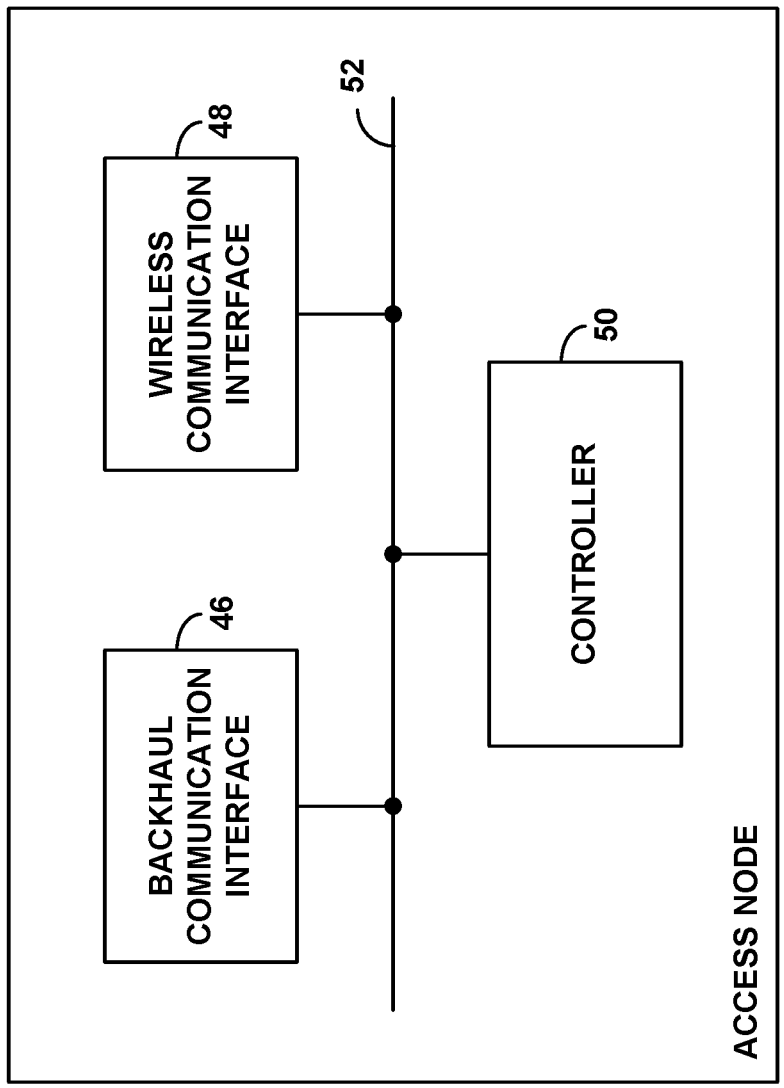
FIG. 4 is a simplified block diagram of an example access node operable in accordance with the disclosure.

FIG. 4 is next a simplified block diagram of an example access node that could operate in a wireless communication system such as that noted above for example, to carry out various features described herein. As shown, the example access node includes a backhaul communication interface 46, a wireless communication interface 48, and a controller 50, all of which could be integrated together and/or communicatively linked together by a system bus, network, or other connection mechanism 52.

In an example implementation, the backhaul communication interface 46 could comprise a wired or wireless interface, such as an Ethernet network communication interface, configured to support backhaul communication on a core network. And the wireless communication interface 48 could comprise an antenna structure, which could be tower mounted or could take other forms, and associated components such as a power amplifier and a wireless transceiver, so as to facilitate providing a cell defining an air interface and engaging air-interface communication on the air interface in accordance with an applicable RAT.

Further, the controller 50 (which might be provided by a baseband unit of the access node, for instance) could comprise one or more processors (e.g., one or more general purpose processors and/or specialized processors) programmed to cause the access node to carry out various operations such as those discussed herein, including for example the operations of FIG. 2.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for dynamically controlling connection-request transmission in a cell of a wireless communication system, the method comprising:
   determining a rate at which the cell has experienced access blocks due to connection-request communication failure; and
   using the determined rate as a basis to dynamically set a maximum allowed number of connection-request transmissions per access attempt in the cell,
   wherein using the determined rate as a basis to dynamically set the maximum allowed number of connection-request transmissions per access attempt in the cell comprises (i) determining, by referring to mapping data that correlates various rates of access blocks respectively to associated maximum allowed numbers of connection-request transmissions per access attempt, a maximum allowed number of connection-request transmissions corresponding with the determined rate and (ii) based on the determining of the maximum allowed number, setting the maximum allowed number of connection-request transmissions per access attempt in the cell to be the determined maximum allowed number.

2. The method of claim 1, wherein the cell is provided by an access node, wherein the access node supports access attempts by user equipment devices (UEs), each access attempt by a UE respectively including (i) the UE engaging in random access signaling with the access node and (ii) the UE then engaging in up to the maximum allowed number of connection-request transmissions to the access node in an effort to ensure successful receipt by the access node of a connection request from the UE, wherein an access block occurs if the access node does not successfully receive connection-request transmission from the UE through the maximum allowed number connection-request transmissions by the UE.

3. The method of claim 2, wherein the UE engaging in up to the maximum allowed number of connection-request transmissions to the access node is a hybrid automatic repeat request (HARM) process.

4. The method of claim 3, wherein the maximum allowed number of connection-request transmissions per access attempt in the cell is defined by a maxHARQ-Msg3Tx value.

5. The method of claim 1, wherein the mapping data defines progressively higher maximum allowed numbers for progressively higher extents rates of access blocks.

6. The method of claim 1, wherein the cell is set with a default maximum allowed number of connection-request transmission per access attempt, and wherein using the determined rate as a basis to dynamically set the maximum allowed number of connection-request transmissions per access attempt in the cell comprises:
   determining that the determined rate is at least as high as a predefined threshold rate; and
   responsive to at least the determining that the determined rate is at least as high as the predefined threshold rate, adjusting the maximum allowed number of connection-request transmissions per access attempt in the cell from the default maximum number to a modified maximum number that is higher than the default maximum number.

7. The method of claim 1, wherein determining the rate at which the cell has experienced the access blocks comprises tracking occurrences of the access blocks in the cell over time and determining the rate as a most recent rate.

8. The method of claim 1, wherein determining the rate at which the cell has experienced the access blocks comprises tracking occurrences of the access blocks in the cell on a per time of day basis to facilitate a prediction of a rate of access blocks in the cell.

9. The method of claim 1, wherein the cell is provided by an access node, and wherein the method is carried out by the access node.

10. The method of claim 1, wherein the cell is provided by an access node, and wherein the method is carried out by a computing system external to the access node,
    wherein using the determined rate as a basis to dynamically set the maximum allowed number of connection-request transmissions per access attempt in the cell comprises the computing system using the determined rate as a basis to determine the maximum allowed number, and the computing system transmitting to the access node a control signal specifying the determined maximum allowed number, the control signal being interpretable by the access node to cause the access node to set the maximum allowed number.

11. The method of claim 1, wherein the cell is provided by an access node, and wherein setting the maximum allowed number of connection-request transmissions per access attempt in the cell comprises setting the maximum allowed number at the access node, wherein the access node broadcasts a control signal that specifies the set maximum allowed number.

12. A computing system operable to control connection-request transmission in a cell of a wireless communication system, the computing system comprising:
- a processing unit;
- non-transitory data storage; and
- program instructions stored in the non-transitory data storage and executable by the processing unit to carry out operations including:
  - determining to a rate at which the cell has experienced access blocks due to connection-request communication failure, and
  - using the determined rate as a basis to dynamically set a maximum allowed number of connection-request transmissions per access attempt in the cell,
  - wherein the computing system includes or has access to mapping data that correlates various rates of access blocks respectively to associated maximum allowed numbers of connection-request transmissions per access attempt, and wherein using the determined rate as a basis to dynamically set the maximum allowed number of connection-request transmissions per access attempt in the cell comprises (i) determining, by referring to the mapping data, a maximum allowed number of connection-request transmissions corresponding with the determined rate and (ii) based on the determining of the maximum allowed number, setting the maximum allowed number of connection-request transmissions per access attempt in the cell to be the determined maximum allowed number.

13. The computing system of claim 12, wherein the cell is provided by an access node, wherein the access node supports access attempts by user equipment devices (UEs), each access attempt by a UE respectively including (i) the UE engaging in random access signaling with the access node and (ii) the UE then engaging in up to the maximum allowed number of connection-request transmissions to the access node in an effort to ensure successful receipt by the access node of a connection request from the UE, wherein an access block occurs if the access node does not successfully receive connection-request transmission from the UE through the maximum allowed number connection-request transmissions by the UE.

14. The computing system of claim 13, wherein the UE engaging in up to the maximum allowed number of connection-request transmissions to the access node is a hybrid automatic repeat request (HARQ) process.

15. The computing system of claim 13, wherein the computing system is provided at the access node.

16. The computing system of claim 12, wherein the mapping data defines progressively higher maximum allowed numbers for progressively higher rates of access blocks.

17. The computing system of claim 12, wherein the cell is set with a default maximum allowed number of connection-request transmission per access attempt, and wherein using the determined rate as a basis to dynamically set the maximum allowed number of connection-request transmissions per access attempt in the cell comprises:
- determining that the determined rate is at least as high as a predefined threshold rate; and
- responsive to at least the determining that the determined rate is at least as high as the predefined threshold rate, adjusting the maximum allowed number of connection-request transmissions per access attempt in the cell from the default maximum number to a modified maximum number that is higher than the default maximum number.

18. At least one non-transitory computer-readable medium having stored thereon program instructions executable by at least one processing unit to carry out operations to control connection-request transmission in a cell of a wireless communication system, the operations including:
- determining a rate at which the cell has experienced access blocks due to connection-request communication failure; and
- using the determined rate as a basis to dynamically set a maximum allowed number of connection-request transmissions per access attempt in the cell,
- wherein using the determined rate as a basis to dynamically set the maximum allowed number of connection-request transmissions per access attempt in the cell comprises (i) determining, by referring to mapping data that correlates various rates of access blocks respectively to associated maximum allowed numbers of connection-request transmissions per access attempt, a maximum allowed number of connection-request transmissions corresponding with the determined rate and (ii) based on the determining of the maximum allowed number, setting the maximum allowed number of connection-request transmissions per access attempt in the cell to be the determined maximum allowed number.

* * * * *